Jan. 6, 1942. H. J. LEDDY 2,269,092
CONTAINER
Filed May 21, 1938
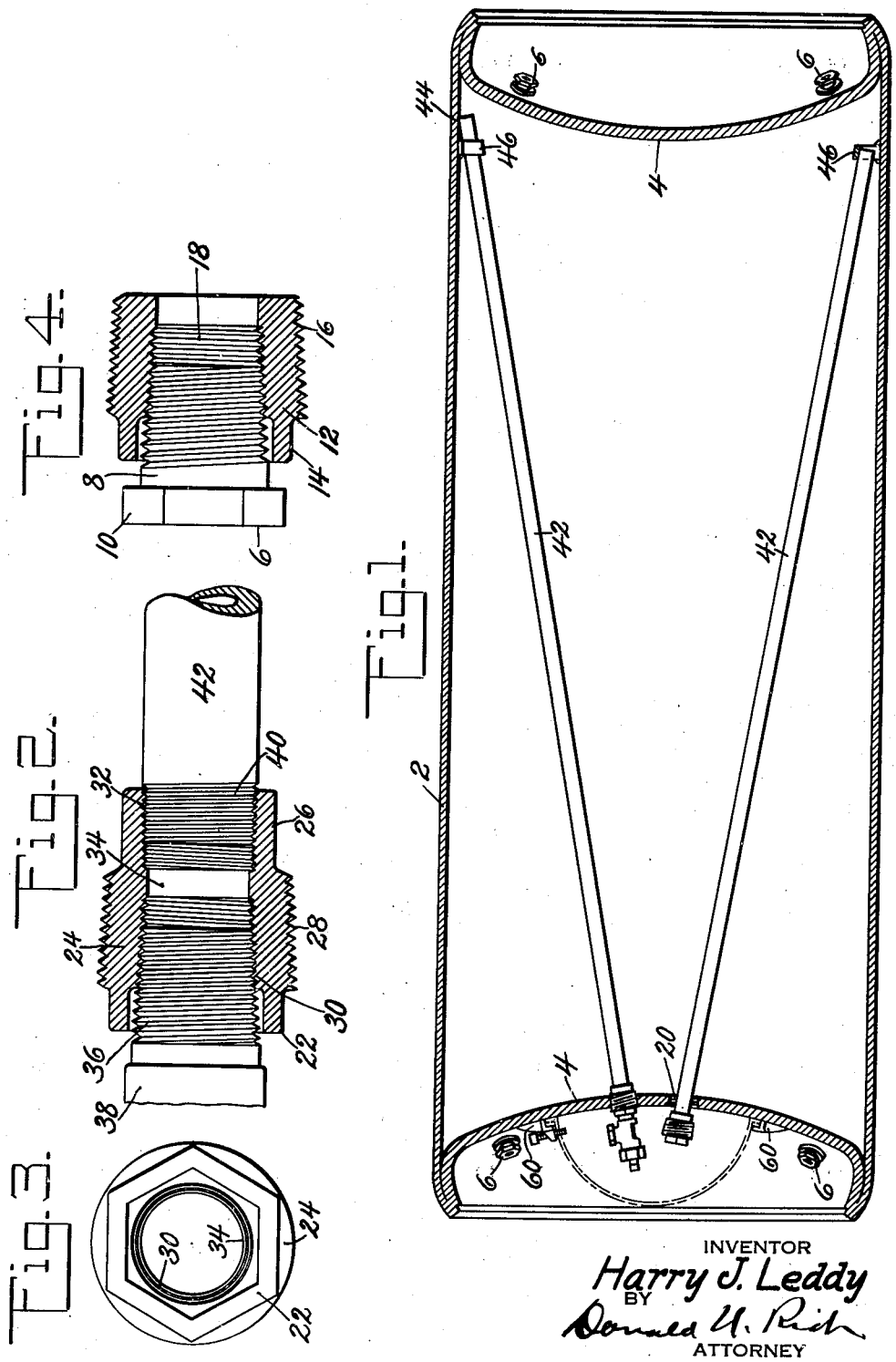
INVENTOR
Harry J. Leddy
BY
Donald U. Rich
ATTORNEY Patented Jan. 6, 1942

2,269,092

UNITED STATES PATENT OFFICE 2,269,092

CONTAINER

Harry J. Leddy, Riverdale, N. Y., assignor to American Welding Company, New York, N. Y., a corporation of Delaware Application May 21, 1938, Serial No. 209,352

3 Claims. (Cl. 220—3)

This invention relates to improvements in containers in general and in particular to containers adapted for carrying either gas or fluids under pressure.

In the past tanks of this type have been constructed welded in one piece and formed by any suitable method such as that described and claimed in Patent No. 1,748,577 granted February 25, 1930, to H. P. Merriam. Tanks of this type have usually had the eduction pipes either welded at one end to the tank or threaded into or carried by a boss or enlargement formed either on the tank shell or ends. The valves or other fittings for controlling flow of the material to and from the tank of necessity must be kept in perfect order, requiring frequent removement of the valve for checking, regrinding or replacement with new valves. Such constant removal and insertion of the valves and fittings of necessity deforms the threads in the boss and after a certain amount of service it is necessary to recondition the boss and this in the old type of construction could only be done by a reworking or entire replacement of the boss necessitating application of relatively high temperatures necessary to welding or forming with the result that the entire tank had to be reannealed which is extremely expensive and impractical for the average shop and impossible for the consumer. It is an object, therefore, of the present invention to provide a tank or other pressure vessel having an eduction pipe which may be readily inserted or removed from the tank or vessel without necessity for expensive reannealing.

A further object of the invention is the provision of a tank or other vessel having an eduction pipe rigidly yet removably secured to the tank at both of its ends and independently of the valves or other exterior fittings.

A yet further object of the invention is the provision of a tank or other pressure vessel having a removable and replaceable fitting to which the eduction pipe and valve or other external fitting may be independently attached.

These and other objects of the invention will be apparent to persons skilled in the art from a study of the following description and accompanying drawing, in which:

Figure 1 is a sectional view taken substantially at the center of the tank and showing the improvements as applied thereto;

Fig. 2 is an enlarged sectional view of the removable fitting or adapter with the eduction pipe and valve secured thereto;

Fig. 3 is an end view of the fitting or adapter shown in Fig. 2 but with the valve and eduction pipe removed therefrom, and Fig. 4 is a sectional view showing another form of fitting or adapter for application of fusion plugs or other safety devices.

Referring now to the drawing in detail, it will be seen that the improvements have been applied to a tank having a shell 2 and inwardly arced ends 4 securely welded to the shell by any suitable means or in any suitable manner, one instance of which is shown, described and claimed in Patent No. 1,748,577 previously referred to. One or both of the ends are provided with safety devices 6, which in the present instance take the form of fusible plugs 8 having a hexagonal head 10 permitting the threading of the plug into the removable fitting 12 (Fig. 4). This fitting is formed at one end with a hexagonal or other shaped portion 14 and at the other end is threaded as at 16 to permit the fitting to be tightly screwed into the end or ends of the tank. The fitting is also internally threaded as at 18 to receive the threads of the fusible plug or other safety means previously referred to.

In order that the eduction pipes, valves, etc., may be readily attached to the tank without damage to the tank or necessity of reannealing the same, one end is provided with openings threaded as at 20 to receive the removable fitting or adapter now to be described. This adapter is formed adjacent one end with a hexagonal or other shaped portion 22, an intermediate thickened portion 24 and an opposite smooth end portion 26. The thickened portion of the adapter is externally threaded as at 28 and internally threaded as at 30, while the smooth end portion is internally threaded as at 32. The threads 30 and 32 are separated from each other by a plain, unthreaded portion 34 all as clearly shown in Fig. 2. The threads 30 are adapted to be engaged by threads 36 formed on the end of the valve or other fitting 38, which valve or fitting may be readily removed from or inserted in the adapter by turning the same relative to the adapter. The threads 32 of the adapter cooperate with threads 40 cut on one end of the eduction pipe 42, the opposite end of which is jammed against the shell of the tank or container as at 44. This jamming of the eduction pipe against the shell is accomplished by means of a loop 46 welded or otherwise secured to the shell and so related to the tank head that the end of the eduction pipe will have engaged within the loop prior to the engagement of the adapter with the threaded hole in the head, all as clearly shown in connection with the lower pipe of Figure 1. It is obvious that with the loop so positioned the assembled eduction pipe and adapter must be forced into the loop in order for the threads 28 to be completely tightened in the threaded opening in the head portion of the tank. Such jamming of the eduction pipe against the shell preferably takes place shortly after the threads 28 have been started in the threaded opening of the head, thus as the adapter is screwed to its final seat in the threaded opening of the head a slight bending force will be applied to the eduction pipe, which force will slightly distort the eduction pipe and insure that the same will remain at its open end in tight contact with the shell. As is customary in most cases lugs 60 are secured to the tank head in order that a removable dome, shown by line and dash Figure 1, may be applied to the tank to protect the valves or other fittings.

From the preceding description it will be clear that the eduction pipe may be securely threaded into the adapter upon a bench after which the adapter and connected eduction pipe may be inserted through the threaded opening in the tank head with the eduction pipe entering the retaining strap 46 and being forced into jamming relation with the tank shell by the tightening of the adapter in the threaded opening of the head. This tightening may be readily accomplished by means of a wrench or other means applied to the hexagonal end portion of the adapter. With the adapter and connected eduction pipe in final position the valve or other fitting may be tightened in the adapter or as is obvious this valve or fitting may be tightened in the adapter prior to the insertion of the entire assembly into the tank. Whenever the valve or other fitting requires regrinding or testing as it does quite frequently, it may be readily removed from the adapter by turning the valve or fitting relative to the adapter. This insertion or removal of the valve or fitting from the adapter of necessity damages and wears away the threads with the result that a slight leak may develop under the high pressures and types of gas or fluid encountered. In case such a leak develops then the adapter and connected eduction pipe must be removed from the tank and a new adapter applied. It is obvious that while the valve or other fitting must of necessity be frequently inserted and removed, the adapter need be replaced only at infrequent intervals and the possibility of damage of its and the tank head threads is unlikely, but in case such damage does occur then it will be only necessary for the tank head opening to be reamed and rethreaded permitting the application of a slightly larger adapter, thus the life of the tank will be indefinitely prolonged without any necessity of reannealing the same at any time during its life, since no heat application will be necessary to repair the same.

While the invention has been described more or less in detail, it is obvious that various modifications and rearrangements of parts will be apparent to persons skilled in the art and all such modifications and rearrangements of parts are contemplated as fall within the scope of the following claims.

What is claimed is:

1. In a pressure container the combination of a side wall, a pair of end walls connected to the side wall to form the container, an adapter removably secured to one end wall, a substantially straight eduction pipe secured at one end to the adapter and having its free end disposed within the container, and means removably anchoring the free end of the eduction pipe within the container at an angle to the side walls thereof, said means engaging the eduction pipe at a point removed from the free end thereof and of such a height as to deflect the pipe and jam the same into anchored position during final securing of the adapter to said one end wall.

2. In a pressure container the combination of a side wall, a pair of end walls connected to the side wall to form the container, an adapter removably secured to one end wall, a substantially straight eduction pipe secured at one end to the adapter and extending along the side wall of the container at a substantially constant angle, and a loop secured to the side wall to receive the free end of the eduction pipe, said loop being so formed and arranged as to engage the free end portion of the pipe and act as a fulcrum to deflect the pipe from a true straight line and jam the same against the container side wall during the final securing of the adapter to said one end wall.

3. In a pressure container the combination of a side wall, a pair of end walls connected to the side wall to form a container, a threaded opening in one of the end walls, an adapter having threaded engagement with the opening, a substantially straight eduction pipe secured at one end of the adapter and extending along side the side wall at a substantially constant angle thereto, and retaining means secured to the side wall and engageable over a portion of the eduction pipe adjacent the free end thereof, said retaining means constituting a loop so arranged as to receive the free end of the pipe prior to the threaded engagement of the adapter with the opening and allowing rotation of the pipe in the loop during threading of the adapter in the end wall opening.

HARRY J. LEDDY.